(12) United States Patent
Liu

(10) Patent No.: US 6,937,368 B2
(45) Date of Patent: Aug. 30, 2005

(54) LOCKING DEVICE FOR A MOVABLE MODULE OF AN APPARATUS

(75) Inventor: Chin-Te Liu, Taipei (TW)

(73) Assignee: Lite-On Technology Corp., Taipei (TW)

( * ) Notice: Subject to any disclaimer, the term of this patent is extended or adjusted under 35 U.S.C. 154(b) by 855 days.

(21) Appl. No.: 09/982,864

(22) Filed: Oct. 22, 2001

(65) Prior Publication Data

US 2003/0076545 A1 Apr. 24, 2003

(51) Int. Cl.[7] .............................. H04N 1/04; H04N 1/40; E05C 19/10; E05C 3/04; E03G 15/04
(52) U.S. Cl. ................. 358/474; 358/471; 358/483; 358/497; 292/101; 292/103; 292/202; 292/203; 399/211
(58) Field of Search ................. 358/474, 471, 358/483, 497; 292/101, 103, 202, 203; 399/211

(56) References Cited

U.S. PATENT DOCUMENTS

| 5,973,866 A | * | 10/1999 | Tseng | ......................... 359/896 |
| 6,247,374 B1 | * | 6/2001 | Tseng | ......................... 74/89.22 |
| 6,529,294 B1 | * | 3/2003 | Chang | ......................... 358/471 |
| 6,700,717 B2 | * | 3/2004 | Lee | ............................. 359/896 |

* cited by examiner

Primary Examiner—Edward Coles
Assistant Examiner—Houshang Safaipour
(74) Attorney, Agent, or Firm—Rosenberg, Klein & Lee

(57) ABSTRACT

A locking device for locking a movable module of an electronic apparatus disclosed by the invention mainly includes a control member and a latch connected to the control member. The control member is selectively movable between a first position for locking the movable module and a second position for releasing the movable module. When the latch stops at the first position, it also latches onto an operational interface or a mechanism component so as to prevent the user from electrically or mechanically operating the apparatus.

13 Claims, 10 Drawing Sheets

LOCKING DEVICE FOR A MOVABLE MODULE OF AN APPARATUS

BACKGROUND OF THE INVENTION

1. Field of the Invention

The invention generally relates to a locking device for a movable module of an apparatus, and more particularly relates to a device applicable to an electronic apparatus, such as a scanner or a multi-functional printer, for locking a movable module like an optic-mechanic module so that the apparatus cannot be operated until the locking device is released.

2. Related Art

In the modern technology of digital appliances, optic-mechanic or optic-electronic devices, such as scanners, digital cameras and digital camcorders, are increasingly being put into use. In particular, scanners that can transform paper documents into electronic files have been widely used in the office environment.

A scanner, for example, generally includes a case, a cover, an optic-mechanic module and a driving mechanism. The base includes a scanning flatbed. The cover is pivotally mounted on one side of the case for protecting the flatbed. The optic-mechanic module and a driving mechanism are mounted inside the case. The optic-mechanic module is mounted on a carrier that is driven by the driving mechanism so as to be movable within a range on the flatbed. The optic-mechanic module is a key component influencing the performance of the scanner. Since the optic-mechanic module is movable, it is easy to be displaced or damaged by vibrations during transportation. Therefore, the manufacturers of scanners usually provide a locking element to lock the optic-mechanic module before transportation so as to prevent the optic-mechanic module from being damaged during transportation. The user has to remove the locking element before operating the scanner.

Though scanner manufacturers may provide a clear notice to inform the user to remove the locking element before using, the user may neglect the notice and operate the scanner without removing the locking element, which may cause damage to the driving mechanism or the optic-mechanic module.

In order to solve the aforesaid problem, a manufacturer has designed a locking device mounted adjacent to the connecting ports of the scanner that blocks the connecting ports when locking the optic-mechanic module. Therefore, a user cannot connect a cable or a power cord to the scanner before releasing the locking device, and is thus prevented from improperly starting the scanner when using it for the first time. However, after the locking device is released and the cables are connected, the user will not remove the cables and rearrange the locking device when moving the scanner later, since such operations are rather bothersome, or because the user does not realize the purpose of the locking device. Therefore, such a locking device is not good enough.

SUMMARY OF THE INVENTION

The object of the invention is therefore to provide a locking device for a movable module of an apparatus that correlates to the operational interface so that the interface, i.e., the apparatus, cannot be operated before the locking device is released.

A locking device for a movable module of an apparatus according to the invention mainly includes a control member and a latch connected to the control member. The control member is selectively movable between a first position for locking the movable module and second position for releasing the moving module. When the latch stops at the first position, it also hinders an operational interface that prevents the user from electrically operating the apparatus.

A further objective of the invention is to provide a locking device for a movable module of an apparatus that correlates to an operational mechanism so as to prevent a user from operating the apparatus before releasing the locking mechanism, and thus prevent the apparatus from being damaged.

A locking device for a movable module of an apparatus according to the invention mainly includes a control member and a latch connected to the control member. The control member is selectively movable between a first position for locking the movable module and a second position for releasing the movable module. When the latch stops at the first position, it also latches onto a mechanism component that prevents the user from mechanically operating the apparatus.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow. However, this description is for purposes of illustration only, and thus is not limitative of the invention, wherein.

DETAILED DESCRIPTION OF THE INVENTION

The invention provides a locking device applicable to a movable module of an electronic apparatus, such as a scanner. Though the following examples are of scanners, the application of the invention is not limited to scanners. The locking device is used to selectively fasten and release a movable module of the electronic apparatus so that the apparatus can be safely transported when the locking device locks. The apparatus cannot be operated when the locking device locks so as to prevent the apparatus from being damaged.

First Embodiment

Figure 1:
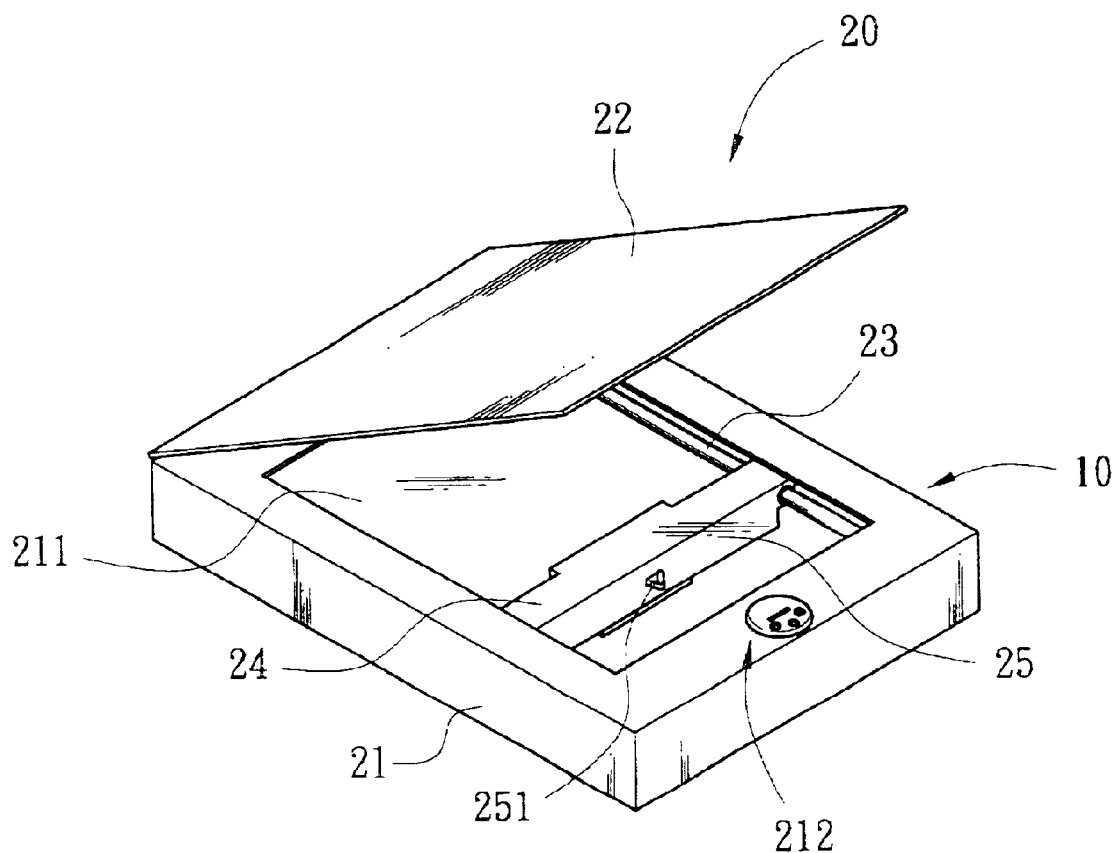
FIG. 1 is a perspective view of a scanner equipped with a first embodiment of a locking device according to the invention.

As shown in FIG. 1, a locking device 10 according to the invention is applied to a scanner 20. The scanner 20 includes a case 21 for mounting components therein. A cover 22 is pivotally mounted on one side of the case 21. The case 21 is formed with a glass flatbed 211 for placing a document or an object (not shown) thereon to be scanned. On one side of the flatbed 211 there is an operational interface 212, including buttons such as on, off and reset, for users to operate the scanner 20. In the case 21, there is a driving mechanism 23, an optic-mechanic module 24 and other electronic or mechanical components (not shown) for performing the functions of the scanner 20. The optic-mechanic module 24 is mounted on a carrier 25, which is driven by the driving mechanism 23, so as to be moved within the range of the flatbed 211 for scanning the document or object placed on the flatbed 211. The techniques for processing scanning are prior arts and are not related to the object of the invention. Therefore, they will not be further described herein.

According to the invention, the carrier 25 of the scanner 20 is controlled to move to the side of the operational interface 212 and locked there before the scanner 20 is packed and delivered. A fastener 251 is formed on the carrier 25. The fastener 251 is generally a rod protruding from the carrier 25.

Figure 2A:
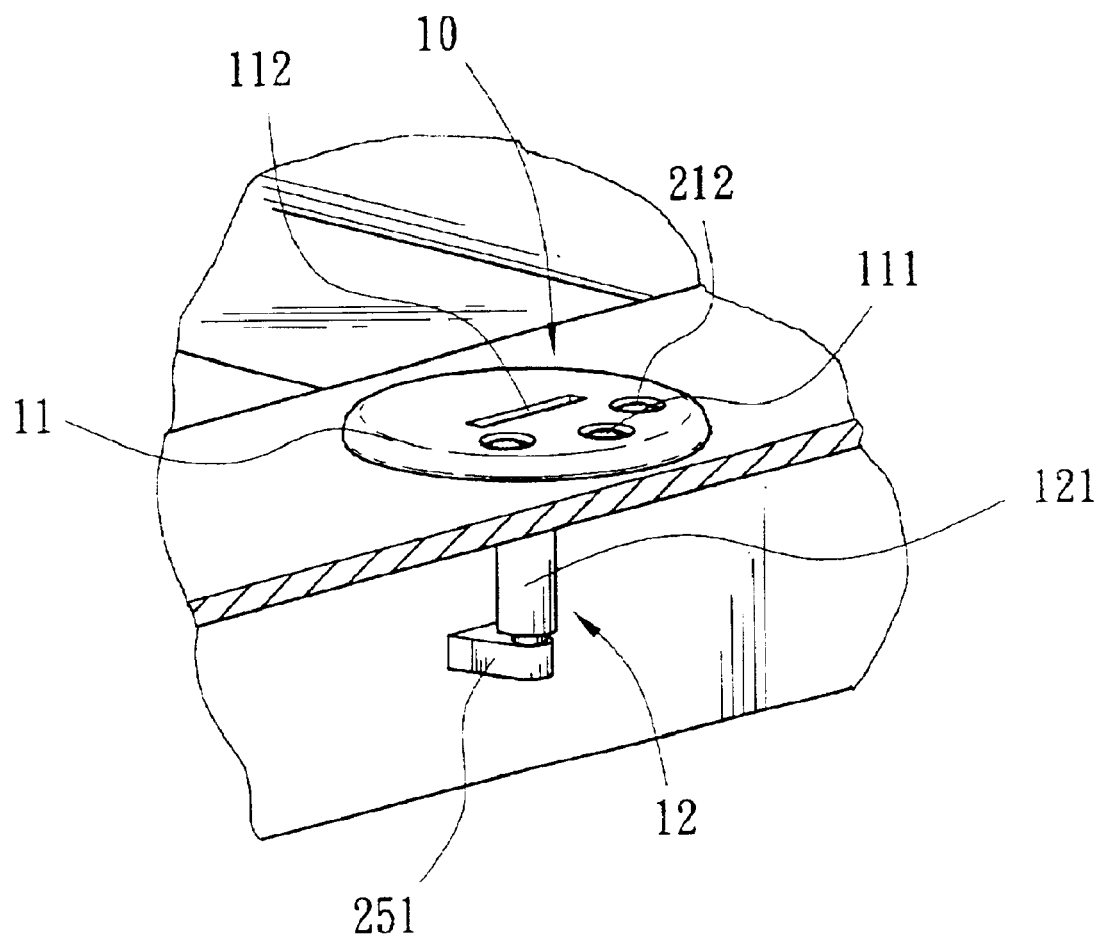
FIGS. 2A and 2B are detailed constructions of the first embodiment of the invention.
Figure 2B:
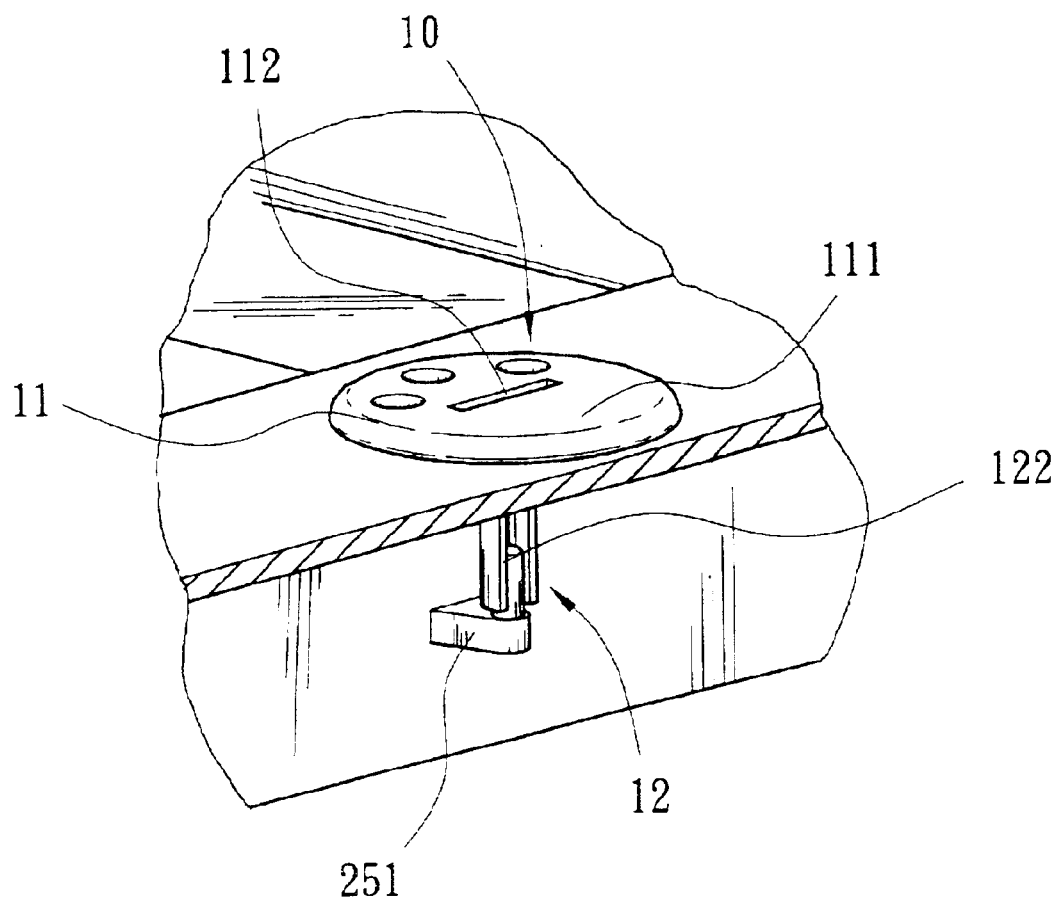

The locking device 10 according to the invention is mounted on the case 21 and is adjacent to the operational interface 212. The locking device 10 includes a control member 11 and a latch 12. As shown in FIGS. 2A and 2B, the control member 11 is a round member furnished with a plurality of through holes 111 corresponding to the buttons of the operational interface 212. The sizes and shapes of the through holes 111 are suitable for users to press through the holes with a finger to operate the buttons. There can also be a slot 112 formed on the control member 11 for the user to use a tool for rotating the control member 11. Of course, the slot 112 is not absolutely necessary since the control member 11 can be rotated by a user's fingers through the holes 111. The latch 12 is substantially a rod with a hook extending under the control member 11. The rod passes through the case 21 for pivotally mounting the control member 11 on the case 21. Therefore, the control member 11 can be rotated between a first position where the operational interface 212 is hindered by the control member 11, and a second position where the through holes 111 of the control member 11 align with the buttons of the operational interface 212 for the user to operate. In the first position, the control member 11 totally covers the operational interface 212 so that the user cannot operate the scanner 20. In the second position, the operation interface 212 is opened to the user so that the user can operate the scanner 20 with the buttons.

The latch 12 extending under the control member 11 is pivotally moved along with the control member 11. The rod of the latch 12 is a U-shaped member having a closed portion 121 and an open portion 122. The open portion 122 corresponds to the fastener 251 of the carrier 25 and has a size suitable for receiving the fastener 251. When the latch 12 is rotated with the control member 11 to the second position, the open portion 122 of the latch 12 faces the fastener 251 where the open portion 122 of the latch 12 can fully receive the fastener 251 as the carrier 25 is being moved toward the locking device 10, and can release the fastener 252 as the carrier 25 is being moved away from the locking device 10. When the latch 12 receives the fastener 251, the latch 12 can further be rotated with the control member 11 to the first position where the open portion 122 of the latch 12 opposes the fastener 251 and the closed portion 121 of the latch 12 latches onto the fastener 251 to prevent it from moving away. Therefore, the latch 12 can be rotated along with the control member 11 between a first position for locking the carrier 25 and a second position for releasing the carrier 25.

Figure 3A:
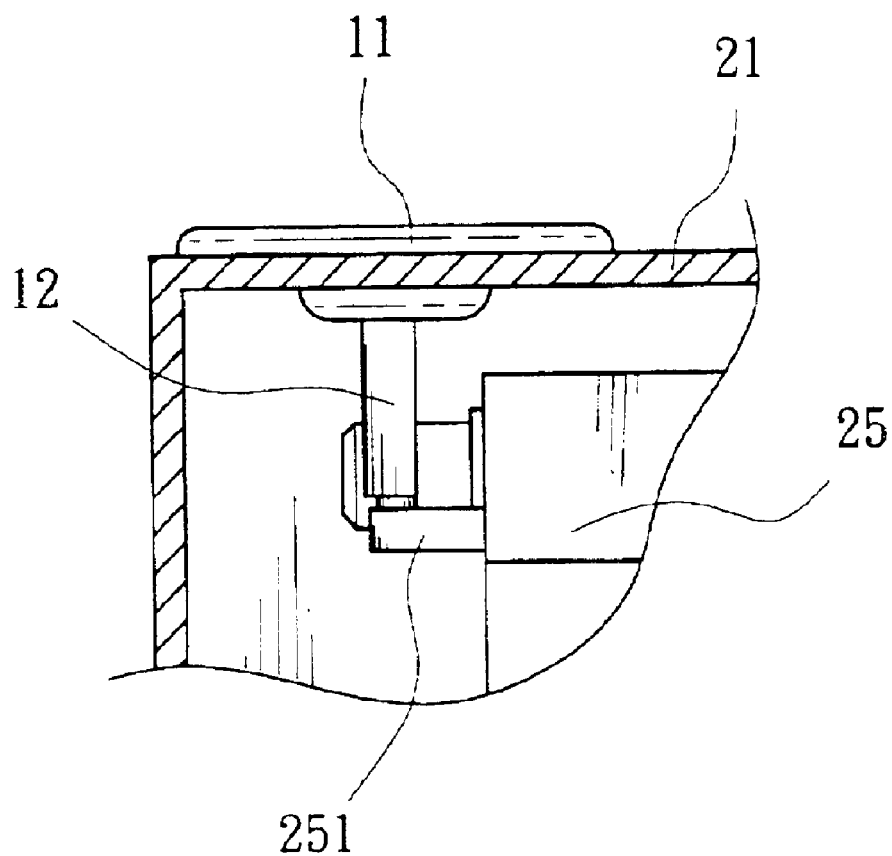
FIGS. 3A and 3B are operational illustrations of the first embodiment of the invention.
Figure 3B:
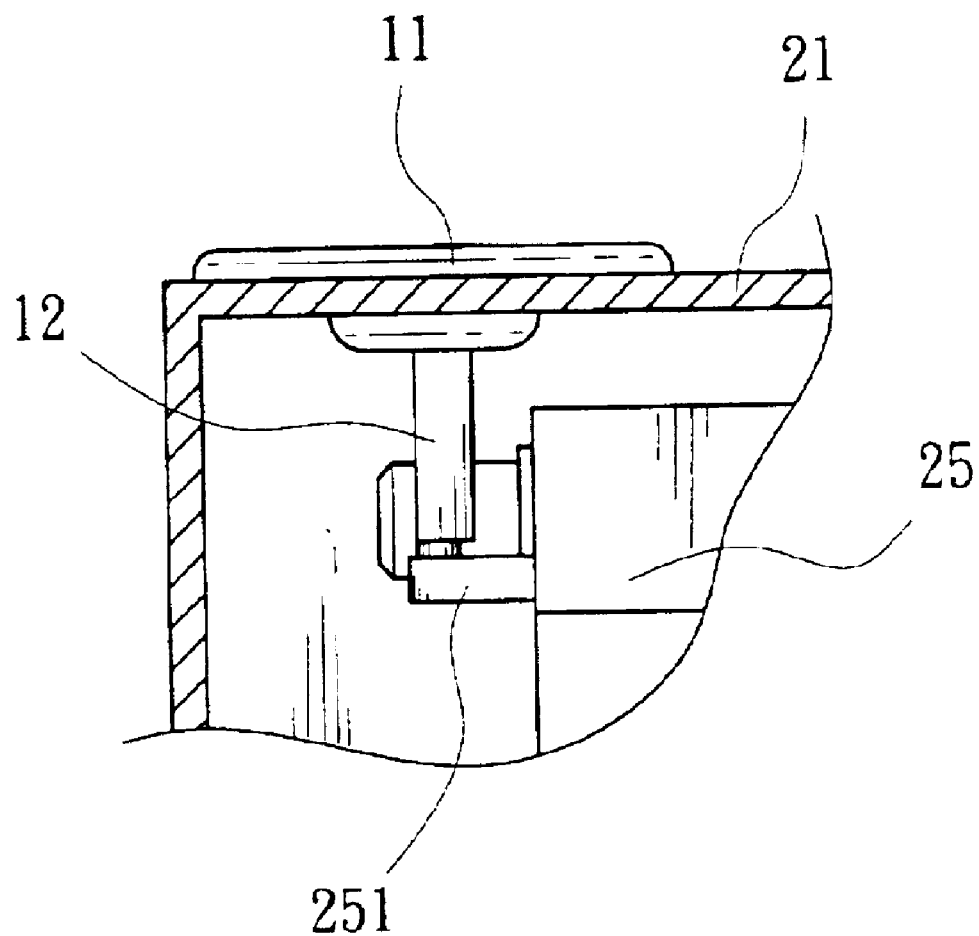

The operations of the latch 12 are further illustrated in FIGS. 3A and 3B. When the manufacturer finishes assembly of the scanner 20 before packing and delivery, the control member 11 is first rotated to the second (releasing) position. The carrier 25 is then moved toward the locking device 10 for moving the fastener 251 into the open portion 122 of the latch 12. Next, the control member 11 is rotated to the first (locking) position for locking the fastener 251 to prevent the carrier 25 and the optic-mechanic module 24 from being moved and damaged during transportation. The control member 11 is also positioned so as to block the operational interface 212 when the carrier 25 is locked so that the operational interface 212 is prevented from being abused or damaged during packing and delivery. After a user sets up the scanner 20 with cables, cords and software, he or she has to rotate the control member 11 to the second position to release the latch 12 from the fastener 251, and make the carrier 25 movable when the scanner 20 is powered on and the operational interface 212 is being opened for use. Afterwards, when the user wants to move the scanner 20 to other places, he or she can rotate the control member 11 again and lock the carrier 25 in place so that the optic-mechanic module 24 won't be moved and damaged during transportation.

Second Embodiment

Figure 4:
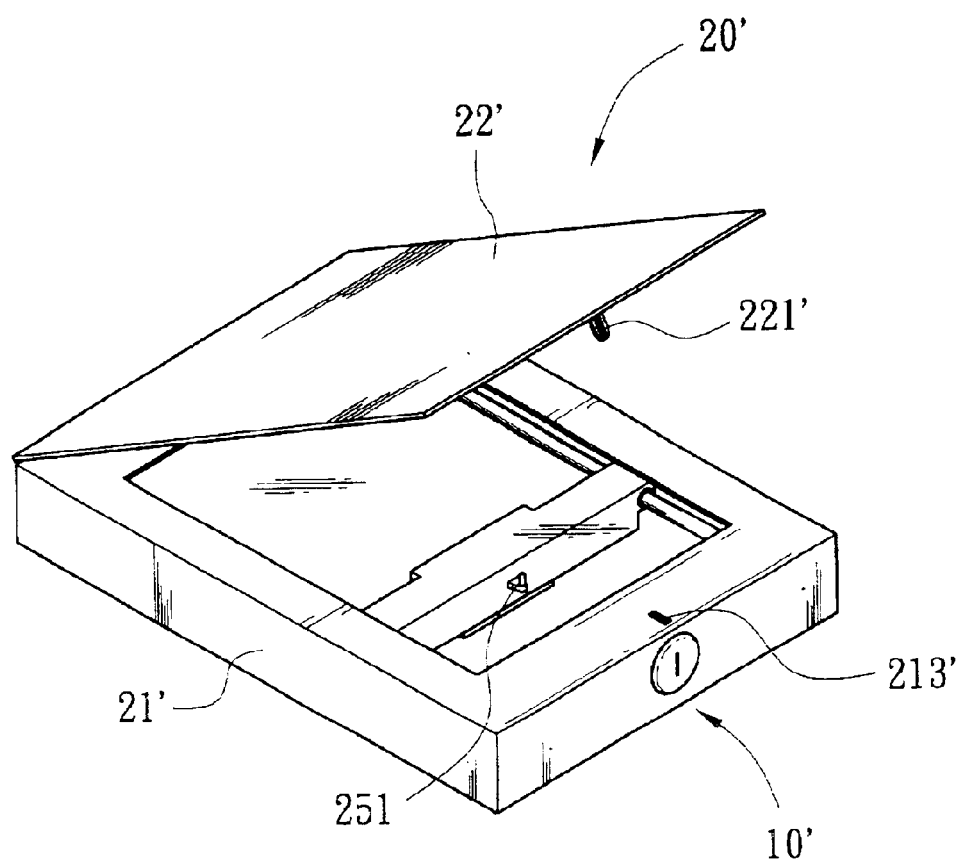
FIG. 4 is a perspective view of a scanner equipped with a second embodiment of a locking device according to the invention.

As shown in FIG. 4, a locking device 10' of a second embodiment of the invention is applied to a scanner 20'. The components of the scanner 20' are similar to that of the scanner 20 of FIG. 1. The difference is that a ring 221' is formed on the front end of the cover 22' and a through hole 213' is formed on a case 21' of the scanner 20' at a position corresponding to the ring 221'.

Figure 5A:
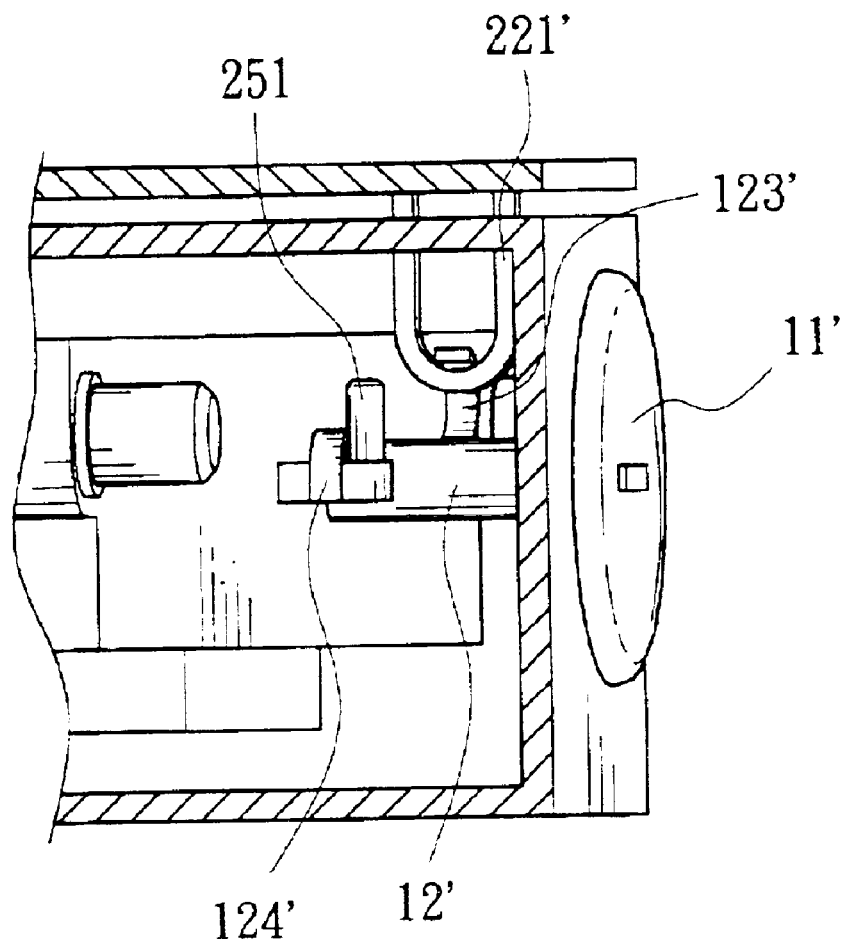
FIGS. 5A and 5B are detailed constructions of the second embodiment of the invention.
Figure 5B:
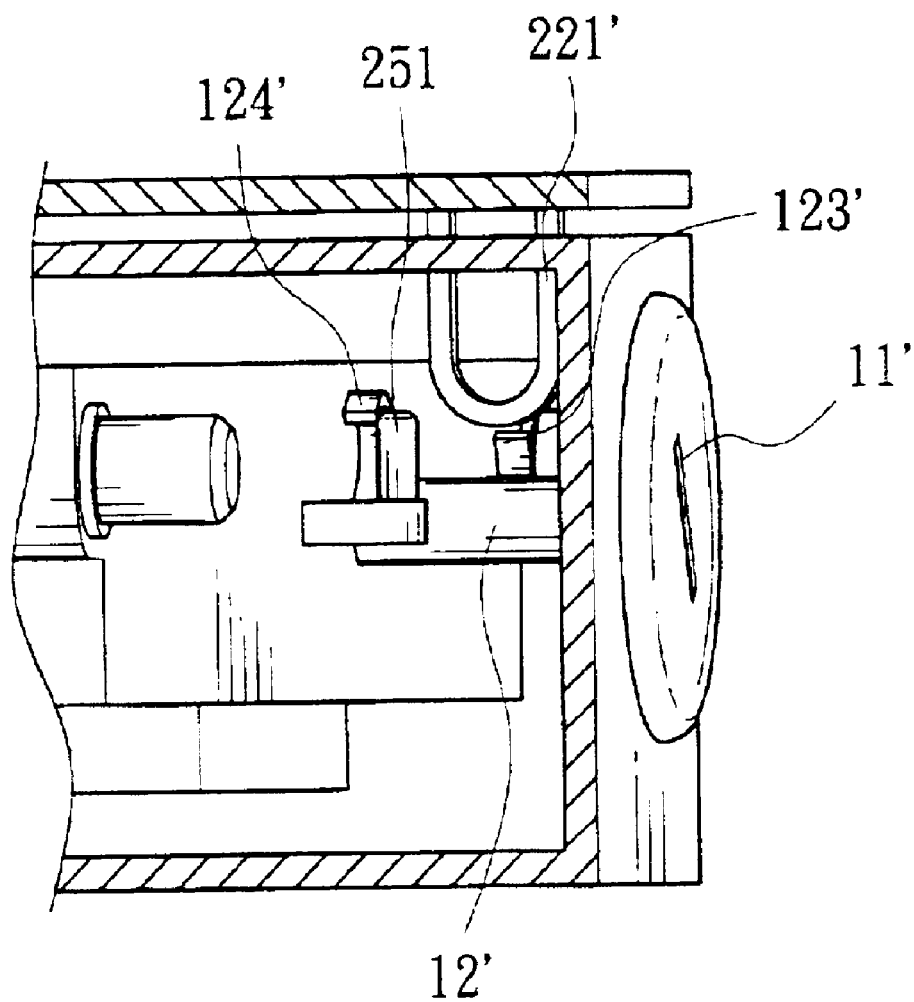
Figure 6A:
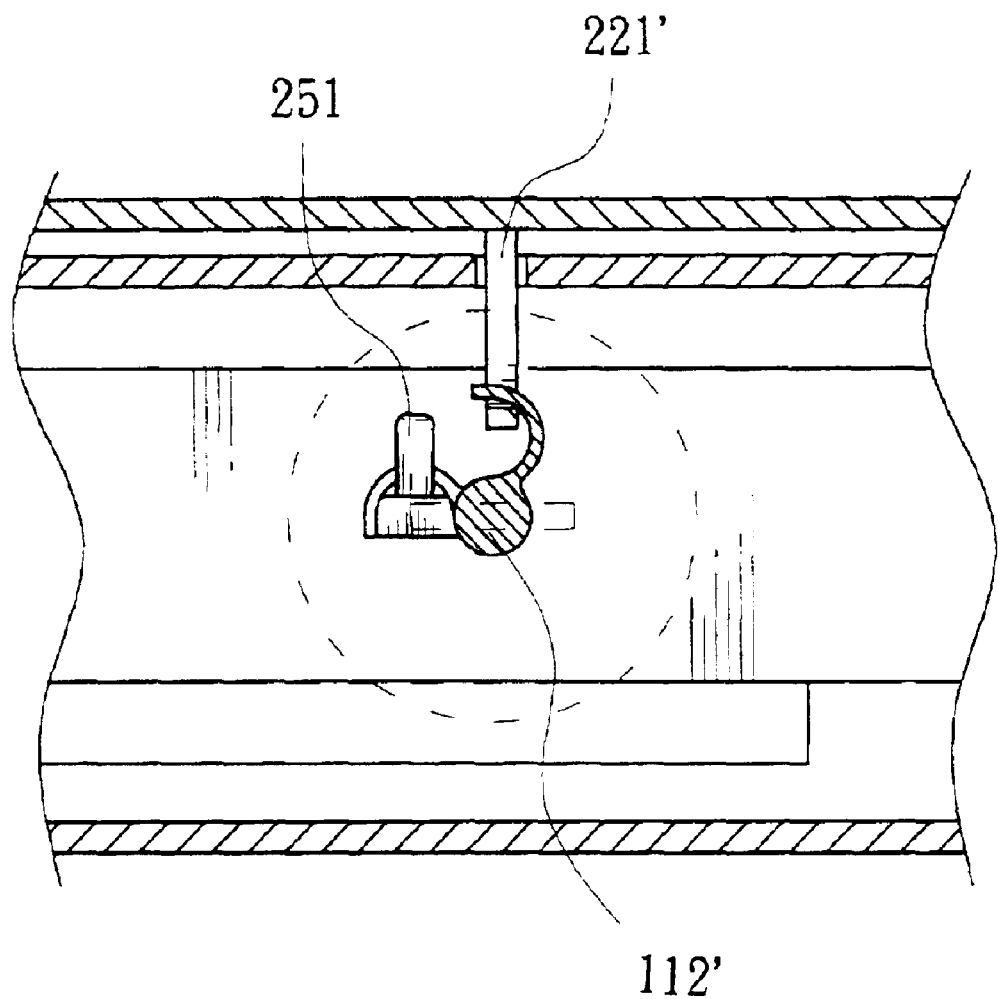
FIGS. 6A and 6B are operational illustrations of the second embodiment of the invention.
Figure 6B:
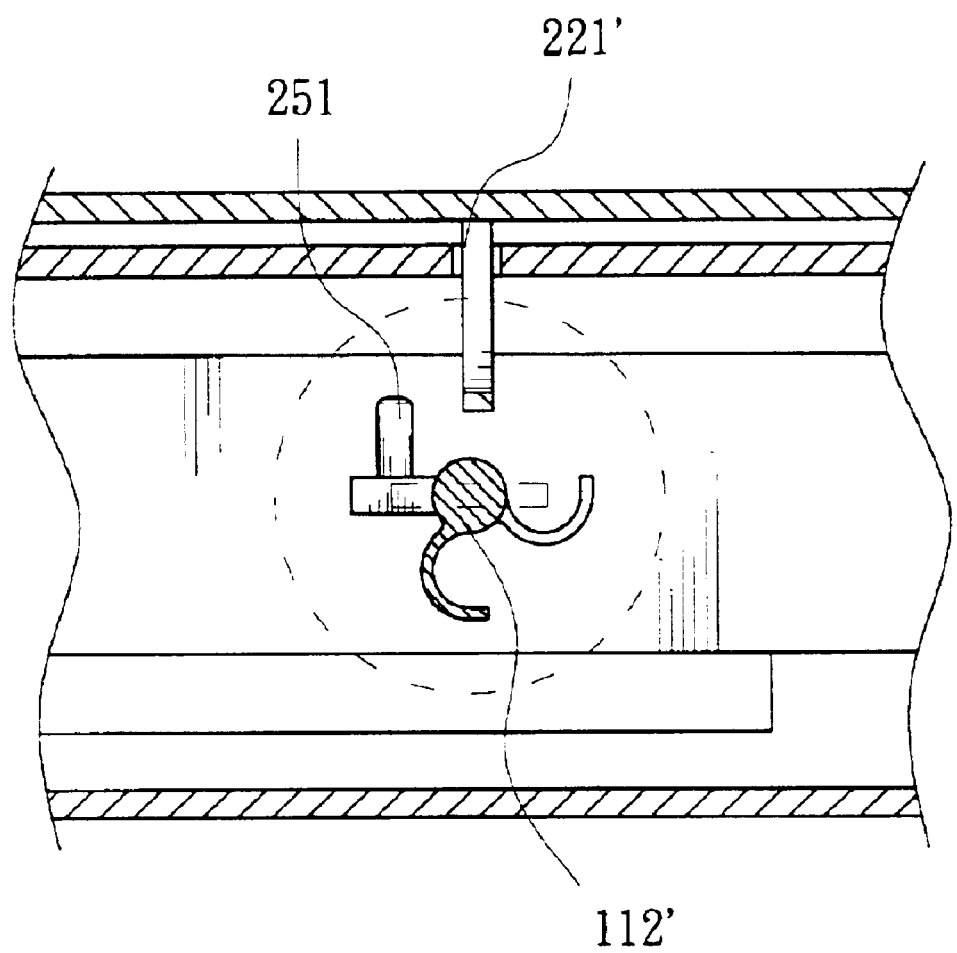

Referring to FIGS. 5A and 5B, the locking device 10' according to the invention is mounted on the case 21 and is adjacent to the hole 213'. The locking device 10' includes a control member 11' and a latch 12'. The control member 11' is also a round member but is not furnished with through holes 111. The control member 11' is located on the front side wall of the case 21' instead of on the upper surface of the case. The latch 12' is substantially a rod extending under the control member 11'. The rod passes through the case 21' for pivotally mounting the control member 11' on the case 21'. There can further be a slot 112' (as shown in FIGS. 6A and 6B) formed on the control member 11' for the user to use a tool to rotate the control member 11'. The latch 12' is formed with a first hook 123' and a second hook 124'. When the cover 22' covers the case 21', the ring 221' of the cover 22' passes through the hole 213' into the case 21' at a position adjacent to the first hook 123'. When the carrier 25 moves toward the locking device 10', the fastener 251 of the carrier 25 moves to a position adjacent to the second hook 124'. In these positions, the latch 12' can be rotated with the control member 11 ' and moved between a first position for locking the ring 221' and the fastener 251 with the hooks 123' and 124' respectively, and a second position for releasing the ring 221 ' and the fastener 251.

Referring to FIGS. 6A and 6B, when the manufacturer finishes assembly of the scanner 20' before packing and delivery, the cover 22' covers the case 21', and the carrier 25 is moved toward the locking device 10'. The control member 11' is then rotated to the first (locking) position for locking the fastener 251 with the hook 124' to prevent the carrier 25 and the optic-mechanic module 24 from being moved and damaged during transportation. Meanwhile, the ring 221' of the cover 22' is locked by the hook 123' to prevent the cover 22' from opening. After a user sets up the scanner 20', he or she has to rotate the control member 11' to the second position to release the hooks 123' and 124' from the fastener 251 and the ring 221', and make the carrier 25 movable when the scanner 20 is powered on and operated and the cover 22' is released for use. Afterwards, when the user wants to move the scanner 20' to other places, he or she can rotate the control member 11' again to lock the carrier 25 and the cover 22' in place so that the optic-mechanic module 24 and the cover 22' won't be moved and damaged during transportation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A locking device applicable to an apparatus having a movable carrier incorporated therein, comprising:
   a control member, movably mounted on said apparatus, for selectively hindering an operational interface of the apparatus upon being moved to a first position, and exposing said operational interface upon being moved to a second position; and
   a latch, fixed to said control member and moved therewith for selectively locking said movable carrier to said apparatus upon being moved with said control member to said first position, and releasing said movable carrier from said apparatus upon being moved with said control member to said second position.

2. A locking device applicable to an apparatus according to claim 1 wherein said apparatus is a scanner; said movable carrier is driven by a driving mechanism and carries an optic-mechanic module.

3. A locking device applicable to an apparatus according to claim 2 wherein said scanner further comprises a case and a cover; said case contains at least said movable carrier, said driving mechanism and said optic-mechanic module; a scanning flatbed formed on said case; and said cover is pivotally mounted on said case for selectively covering said flatbed.

4. A locking device applicable to an apparatus according to claim 1 wherein said operational interface comprises a plurality of buttons.

5. A locking device applicable to an apparatus according to claim 1 wherein said control member is formed a plurality of through holes for exposing said operational interface for user to operate upon being moved to said second position.

6. A locking device applicable to an apparatus according to claim 1 wherein said control member is formed with a slot for user to move said control member with a tool.

7. A locking device applicable to an apparatus according to claim 1 wherein said movable carrier comprises a fastener to be latched by said latch; said latch is formed with a closed portion and an open portion; said open portion opposes to said fastener upon being moved to said locking position, and faces said fastener upon being moved to said releasing position.

8. A locking device applicable to an apparatus having a case, a cover pivotally mounted on one side of said case, and a movable carrier incorporated in said case, comprising:
   a control member, movably mounted on said case; and
   a latch, fixed to said control member and moved therewith for selectively locking said cover and said movable carrier to said case upon being moved with said control member to a first position, and releasing said cover and said movable carrier from said case upon being moved with said control member to a second position.

9. A locking device applicable to an apparatus according to claim 8 wherein said apparatus is a scanner; said movable carrier is driven by a driving mechanism and carries an optic-mechanic module.

10. A locking device applicable to an apparatus according to claim 8 wherein one end of said cover is formed with a ring; and said case is formed with a through hole for receiving said ring upon said cover covering said case.

11. A locking device applicable to an apparatus according to claim 8 wherein said control member is formed with a slot for user to move said control member with a tool.

12. A locking device applicable to an apparatus according to claim 8 wherein said movable carrier comprises a fastener to be latched by said latch.

13. A locking device applicable to an apparatus according to claim 8 wherein said latch is formed with a first hook and a second hook; said first hook latches a ring formed on said cover, and said second hook latches a fastener formed on said movable carrier upon being moved to said locking position.

* * * * *